United States Patent Office 3,806,469
Patented Apr. 23, 1974

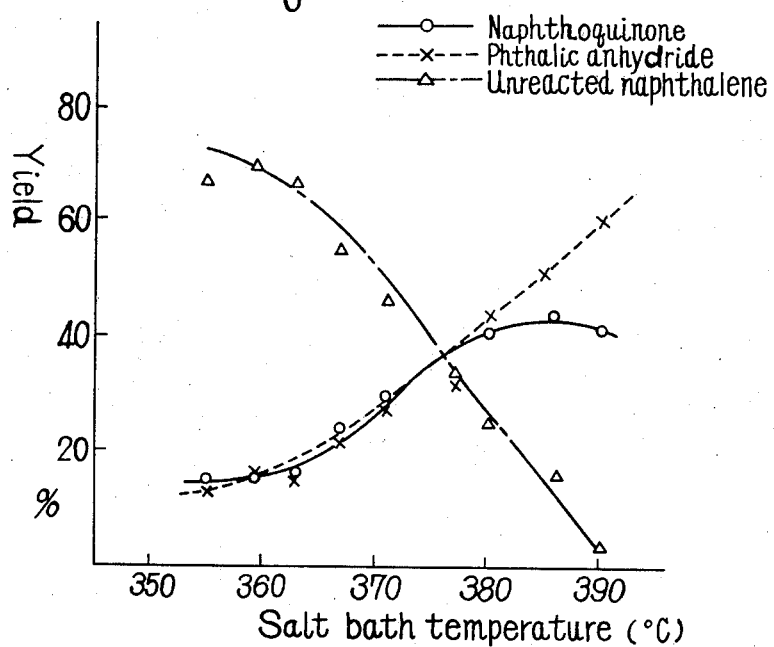
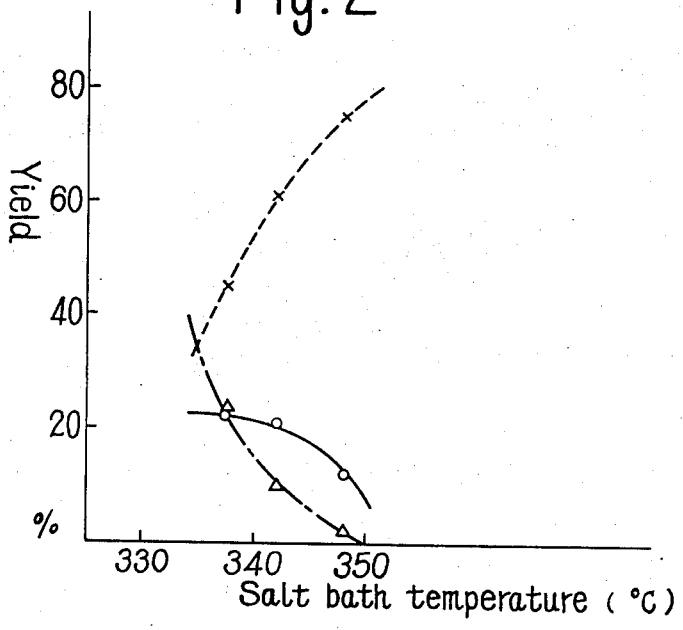

3,806,469
CATALYST COMPOSITIONS CONTAINING VANADIUM AND BORON
Masamichi Morita and Kihachiro Ohta, Kitakyushu, Japan, assignors to Nippon Steel Chemical Co. Ltd.
Filed July 18, 1972, Ser. No. 272,968
Claims priority, application Japan, July 21, 1971, 46/53,876
Int. Cl. B01j 11/82
U.S. Cl. 252—432                                5 Claims

ABSTRACT OF THE DISCLOSURE

A new catalyst composition useful for the vapor phase oxidation of naphthalene to naphthoquinone, has been found, said catalyst composition comprising silicon oxide, vanadium pentoxide and potassium sulfate in combination with 30 to 300% by weight, based on the weight of the vanadium pentoxide, of a boron compound as $B_2O_3$. The characteristic feature of this composition is to include the boron compound together with the silicon oxide. The technical advantages obtained thereby include excellent selectivity for desired reaction and good service life over a long run operation.

---

This invention relates to catalysts for use in the production of naphthoquinone by the vapor phase catalytic oxidation of naphthalene.

It has been known that naphthoquinone is obtained as a by-product when phthalic anhydride is produced by the vapor phase catalytic oxidation of naphthalene. In that case, the amount of naphthoquinone is usually several percent based on the weight of the oxidation product obtained. It has only been possible to obtain naphthoquinone in at most 20% yield even when the oxidation was carried out under conditions most favorable for the formation of naphthoquinone.

Extensive studies and investigations conducted by us on catalysts, in the presence of which naphthoquinone is obtained in high yields in the course of the vapor phase catalytic oxidation of naphthalene, have resulted in the present invention. That is, the present invention is concerned with catalysts for use in the production of naphthoquinone, said catalysts being characterized by containing silicon oxide, vanadium pentoxide, potassium sulfate, and a boron compound, the last component being present in an amount of 30–300% by weight as $B_2O_3$, based on the weight of vanadium pentoxide.

In accordance with the present invention, the relative proportion of silicon oxide, vanadium pentoxide and potassium sulfate in the catalyst of this invention need not be at any specified value, but preferably it should be 3–15% by weight of $V_2O_5$, 150–500% by weight, based on $V_2O_5$, of $K_2SO_4$, 30–300%, based on $V_2O_5$, of $B_2O_3$ and the balance of $SiO_2$. Those catalyst which contain, in addition to the above composition, 0–40% by weight, based on $K_2SO_4$, of $Na_2SO_4$ or $Li_2SO_4$, can exhibit excellent selectivity with good service life over a long run operation. In accordance with the present invention, it is essential that a boron compound be present in addition to silicon oxide, vanadium pentoxide and potassium sulfate. It has been found that conventional catalyst systems comprising silicon oxide, vanadium pentoxide and potassium sulfate, to which a phosphate or potassium pyrosulfate that is generally believed to have properties to deactivate the catalyst and suppress perfect combustion is added, fail to display such effect as obtained in the present invention. In the present invention, the boron compound may be present in an amount of 30–300% by weight as $B_2O_3$ based on the weight of vanadium pentoxide. Excellent results may be obtained when the amount of the boron compound contained is 60–300% by weight based on the vanadium pentoxide in the resulting catalyst.

The catalyst of this invention may be prepared by mixing the above catalyst components in appropriate proportions so that the composition of the resulting catalyst may fall within the above-mentioned range. The catalyst, however, is preferably prepared according to practically the same procedure as in the case of catalysts for use in the production of phthalic anhydride, said catalysts containing silicon oxide, vanadium pentoxide and potassium sulfate as their catalyst components. The catalyst of this invention may be prepared by adding to silica gel, as a silicon oxide component, prepared by the gelation of a potassium silicate solution with sulfuric acid with or without addition thereto of ammonia water, the other catalyst components, or adding the other catalyst components to the silicon oxide and potassium sulfate components which have been prepared by the gelation of the potassium silicate solution after having suitably controlled the proportions of the silicon oxide, potassium sulfate and ammonium sulfate by selection of filtering and rinsing conditions. Alternatively, the catalyst components, such as ammonium metavanadate, vanadium pentoxide, boric acid, boron, etc., may be dissolved, prior to the aforesaid gelation, in a potassium silicate or sulfuric acid solution. The present catalysts may also be prepared by adding the catalyst components to dry pulverized silica gel and mixing or kneading the mixture followed by molding and calcining, or subjecting silica gel containing the catalyst components to mixing or kneading followed by molding and calcining.

Preferable as the vanadium pentoxide component used in the present invention are vanadyl salts such as vanadyl oxalate and vanadyl tartrate, ammonium metavanadate and $V_2O_5$ itself. As the boron compound, potassium borate, ammonium borate, boric acid and boron oxide itself are preferred. Further, the presence of sodium sulfate or lithium sulfate in the present catalyst has a favorable effect thereon.

The production of naphthoquinone by the vapor phase catalytic oxidation of naphthalene in the presence of the catalyst of this invention may preferably be carried out at SV (space velocity) of 300–2000 hr.$^{-1}$, naphthalene concentration of 30–50 g./m.$^3$, and temperature of 290°–430° C. Under such conditions, the oxidation gives the naphthoquinone in about 40% yield.

The present invention is illustrated below with reference to examples.

EXAMPLE 1

To a mixture comprising 500 g. of a potassium silicate solution having a specific gravity of 1.288 and the $SiO_2/K_2O$ molar ratio of 3.6 and 645 ml. of a 8.5% ammonia water, was added sulfuric acid until the pH of the mixture became 7.5, whereby the gelation of the mixture took place. Filtration was continued until the filtrate amounted to 55% of the total volume of the liquid mixture, and thereafter the resulting gel was dried and ground.

To 200 g. of the gel thus obtained were added a vanadyl oxalate solution equivalent to 12 g. of $V_2O_5$ and a solution containing 10 g. of $B_2O_3$. The mixture was stirred and kneaded and formed into tablets of 5 mm. in length and 5 mm. in diameter. The tablets were calcined at 360° C. for 12 hours to give a catalyst having a specific gravity of 0.5.

In a reaction tube, 20 mm. in diameter, was placed 200 ml. of the catalyst, and air oxidation was effected at varying salt bath temperatures with SV=1000 hr.$^{-1}$ and naphthalene concentration of 40 g./m.$^3$. The results are shown in FIG. 1.

EXAMPLE 2

Using a catalyst prepared according to the same procedure a in Example 1 except that 23 g. of $H_3BO_3$ was added in place of the $B_2O_3$, air oxidation was carried out under the conditions where SV was 1,100 hr.$^{-1}$, naphthalene concentration was 42 g./m.$^3$ and salt bath temperature was 365° C. As a result, there were obtained 38% naphthoquinone, 40% phthalic anhydride and 21% unreacted naphthalene.

EXAMPLE 3

To a mixture of the solution of potassium silicate and ammonia water used in Example 1 was first added 16 g. of $V_2O_5$, and then a sulfuric acid solution containing 20 g. of $B_2O_3$ until the pH of the resulting mixture became 7.5, whereby gelation of the mixture took place. Filtration was effected until the filtrate amounted to 55% of the total volume of the liquid mixture, and thereafter, the resulting gel was dried and ground.

The gel was kneaded with a suitable amount of water and the kneaded product was formed into pellets, 5 mm. in length and 5 mm. in diameter. The pellets were then calcined to obtain at catalyst. Using this catalyst, air oxidation of naphthalene was effected under the conditions of SV=1000 hr.$^{-1}$, naphthalene concentration of 44 g./m.$^3$ and salt bath temperature of 345° C. There were obtained 40% naphthoquinone, 42% phthalic anhydride and 27% unreacted naphthalene.

EXAMPLE 4

A catalyst was prepared in the same manner as in Example 1 except that $Na_2B_4O_7 \cdot 10H_2O$ in an amount (55 g.) equimolar with $B_2O_3$ was added in place of the $B_2O_3$.

With this catalyst, air oxidation of naphthalene was carried out under the reaction conditions of SV=1000 hr.$^{-1}$, naphthalene concentration of 42 g./m.$^3$ and salt bath temperature of 375° C. There was obtained 38% naphthoquinone, 40% phthalic anhydride and 25% unreacted naphthalene.

COMPARATIVE EXAMPLE 1

A catalyst was prepared by the same procedure as in Example 1, but without addition of the $B_2O_3$.

Under the reaction conditions of SV=1000 hr.$^{-1}$ and naphthalene concentration of 40 g./m.$^3$, air oxidation of naphthalene was carried out at varying salt bath temperatures in the presence of the catalyst obtained above. The results are shown in FIG. 2.

FIG. 1 is a diagram showing the relationship between temperature and yield when the present catalyst was used, and FIG. 2 is a diagram showing the relationship between temperature and yield when a reference catalyst was used.

COMPARATIVE EXAMPLE 2

A catalyst was prepared following the same procedure as in Example 1 except that 20 g. of $K_2C_2O_7$ was added in place of the $B_2O_3$. With this catalyst, air oxidation of naphthalene was effected under the conditions of SV=1100 hr.$^{-1}$, naphthalene concentration, of 40 g./m.$^3$ and salt bath temperature of 341° C. As a result, 26% naphthoquinone, 54% phthalic anhydride and 18% unreacted naphthalene were obtained.

COMPARATIVE EXAMPLE 3

A catalyst was prepared in the same manner as in Example 1, except that 18.6 g. of $(NH_4)_2HPO_4$ was added in place of the $B_2O_3$.

Air oxidation of naphthalene was effected in the presence of the above-obtained catalyst under the conditions of SV=1000 hr.$^{-1}$, naphthalene concentration of 41 g./m.$^3$ and salt bath temperature of 348° C. Thus, 16.4% naphthoquinone, 35.9% phthalic anhydride and 18% unreacted naphthalene were obtained.

EXAMPLE 5

Two hundred (200) grams of the gel obtained in the same manner as in Example 1 was mixed, stirred and kneaded with an aqueous suspension containing 16 g. of $V_2O_5$ powder, 20 g. of $B_2O_3$, 6 g. of potassium sulfate and 10 g. of ammonium sulfate. The kneaded product was formed into tablets, 5 mm. in length and 5 mm. in diameter and the tablets were calcined at 520° C. for 10 hours to give a catalyst.

With the catalyst thus obtained, air oxidation of naphthalene was carried out under the conditions of SV=1000 hr.$^{-1}$, naphthalene concentration of 40 g./m.$^3$ and salt bath temperature of 390° C. Thus, 50.0% naphthoquinone, 40% phthalic anhydride and 20% unreacted naphthalene were obtained.

The above air oxidation was repeated except that the salt bath temperature employed was 396° C., whereby 49.3% naphthoquinone, 57.1% phthalic anhydride and 3.8% unreacted naphthalene were obtained.

EXAMPLE 6

Two hundred (200) grams of the gel obtained by the same procedure as in Example 1 was subjected to wet molding to form it into tablets, 5 mm. in length and 5 mm. in diameter, and the tablets were calcined at 450° C. 440 ml. of the tablets was impregnated with a hot solution containing 12 g. of vanadyl tartrate, calculated as $V_2O_5$, and 20 g. of $B_2O_3$, and the impregnated tablets were than dried and calcined at 520° C. for 10 hours to obtain a catalyst.

With the catalyst obtained above, air oxidation of naphthalene was effected under the conditions of SV=1000 hr.$^{-1}$, naphthalene concentration of 40 g./m.$^3$ and salt bath temperature of 390° C. Thus, 46.8% naphthoquinone, 35.5% phthalic anhydride and 20.5% unreacted naphthalene were obtained.

EXAMPLE 7

Two hundred (200) grams of gel prepared by the same procedure as in Example 1 was mixed, stirred and kneaded with 12 g. of a vanadyl tartrate solution, calculated as $V_2O_5$, and an aqueous solution containing 24 g. of $B_2O_3$ and 6 g. of $K_2SO_4$. The kneaded mixture was formed into tablets, 5 mm. in length and 5 mm. in diameter. The tablets were calcined at 520° C. for 10 hours to obtain a catalyst.

Several runs of air oxidation of naphthalene were carried out in the presence of the catalyst obtained above under the following conditions shown in the table, and the results are shown therein.

| Conditions | | | Result (percent) | | |
| --- | --- | --- | --- | --- | --- |
| SV (hr.$^{-1}$) | Naphthalene concentration (g./m.$^3$) | Salt bath temperature (° C.) | Naphthoquinone | Phthalic anhydride | Unreacted naphthalene |
| 1,000 | 40 | 365 | 45.2 | 45.6 | 23.1 |
| 1,500 | 40 | 370 | 47.2 | 25.0 | 31.4 |
| 800 | 40 | 365 | 42.2 | 38.2 | 21.0 |

EXAMPLE 8

To 200 g. of the gel obtained in Example 1, were added 12 g. of vanadyl oxalate solution, calculated as $V_2O_5$, and an aqueous solution containing 26 g. of $HBO_2$ obtained by heating boric acid. The mixture was stirred and kneaded to form it into tablets, 5 mm. in length and 5 mm. in diameter. The tablets were calcined at 520° C. for 10 hours to obtain a catalyst.

Air oxidation of naphthalene was carried out in the presence of the catalyst obtained above under the conditions of SV=1000 hr.$^{-1}$, naphthalene concentration of 40 g./m.$^3$ and salt bath temperature of 354° C. There were obtained 48.2% naphthoquinone, 37.5% phthalic anhydride and 17.3% unreacted naphthalene.

EXAMPLE 9

Five hundred (500) grams of the gel obtained in the same manner as in Example 1 was mixed, stirred and kneaded with 150 cc. of a vanadyl tartrate solution containing 20 g. of $V_2O_5$ in 100 cc. and an aqueous solution containing 60 g. of $B_2O_5$ and 15 g. of $K_2SO_4$. The kneaded mixture was formed into tablets, 5 mm. in length and 5 mm. in diameter, and the tablets were calcined at 520° C. for 10 hours to obtain a catalyst.

Oxidation of naphthalene was effected over about eight months in a reactor tube. 2.5 cm. in inside diameter and 3 m. in length, racked with 1 liter of the catalyst. The results are shown in the following table.

| Number of days | Conditions | | | Result (wt. percent) | | |
|---|---|---|---|---|---|---|
| | SV (hr.$^{-1}$) | Temp. (° C.) | Conc. (g./m.$^3$) | Naphthoquinone | Phthalic anhydride | Unreacted naphthalene |
| 0-30 | 1,000 | 345 | 40 | 38.4 | 36.4 | 20.1 |
| 235-240 | 1,000 | 342 | 40 | 39.1 | 40.5 | 17.7 |

What we claim is:

1. A calcined catalyst composition for the vapor phase oxidation of naphthalene into 1,4-naphthoquinone, which consists essentially of 3 to 15% by weight, based on the total weight of the composition, of $V_2O_5$. 150 to 500% by weight, based on the weight of said $V_2O_5$, of $K_2SO_4$; and 30 to 300% by weight, based on the weight of said $V_2O_5$ of a boron compound selected from the group consisting of boron oxide, boric acid and its ammonium and alkali metal salts; the remainder being $SiO_2$.

2. A catalyst composition as claimed in claim 1, wherein said boron compound is boron oxide.

3. A catalyst composition as claimed in claim 1, wherein said boron compound is potassium borate.

4. A catalyst composition as claimed in claim 1, wherein said boron compound is sodium borate.

5. A catalyst composition as claimed in claim 1, wherein said $K_2SO_4$ is used in admixture with $Na_2SO_4$ or $Li_2SO_4$ in an amount of up to 40%.

References Cited

UNITED STATES PATENTS

| | | | |
|---|---|---|---|
| 2,863,838 | 12/1958 | Vincent | 252—432 |
| 2,765,323 | 10/1956 | Dixon et al. | 260—396 |
| 2,956,065 | 10/1960 | Walt et al. | 260—396 |

FOREIGN PATENTS

| | | | |
|---|---|---|---|
| 1,205,520 | 11/1965 | Germany | 252—432 |

PATRICK P. GARVIN, Primary Examiner

U.S. Cl. X.R.

260—396 R